United States Patent
Tothill

(10) Patent No.: US 9,726,082 B2
(45) Date of Patent: Aug. 8, 2017

(54) TURBINE BYPASS SYSTEM

(71) Applicant: ALSTOM Technology Ltd, Baden (CH)

(72) Inventor: Mark Harvey Tothill, Bedford (GB)

(73) Assignee: General Electric Technology GmbH, Baden (CH)

( * ) Notice: Subject to any disclaimer, the term of this patent is extended or adjusted under 35 U.S.C. 154(b) by 165 days.

(21) Appl. No.: 13/902,133

(22) Filed: May 24, 2013

(65) Prior Publication Data

US 2013/0251504 A1 Sep. 26, 2013

Related U.S. Application Data

(63) Continuation of application No. PCT/EP2001/070429, filed on Nov. 18, 2011.

(30) Foreign Application Priority Data

Nov. 27, 2010 (GB) .................... 1020144.0

(51) Int. Cl.

| | |
|---|---|
| F02C 7/12 | (2006.01) |
| F01K 3/08 | (2006.01) |
| F01K 7/16 | (2006.01) |
| F01K 9/00 | (2006.01) |
| F01K 13/02 | (2006.01) |
| F28D 17/00 | (2006.01) |
| F28D 20/00 | (2006.01) |

(52) U.S. Cl.
CPC .............. *F02C 7/12* (2013.01); *F01K 3/08* (2013.01); *F01K 7/165* (2013.01); *F01K 9/003* (2013.01); *F01K 13/02* (2013.01); *F28D 17/005* (2013.01); *F28D 20/0056* (2013.01); *Y02E 60/142* (2013.01)

(58) Field of Classification Search
CPC ..... F02C 7/12; F01K 1/00; F01K 3/00; F28D 15/00
USPC ........................ 60/659; 126/617–620; 165/10
See application file for complete search history.

(56) References Cited

U.S. PATENT DOCUMENTS

| | | | |
|---|---|---|---|
| 3,378,244 A | 4/1968 | Walther, Jr. |
| 3,977,197 A | 8/1976 | Brantley, Jr. |
| 4,147,204 A | 4/1979 | Pfenninger |
| 4,192,144 A | 3/1980 | Pierce |

(Continued)

FOREIGN PATENT DOCUMENTS

| | | |
|---|---|---|
| CN | 201496111 U | 6/2010 |
| DE | 3841708 C1 | 12/1989 |

(Continued)

OTHER PUBLICATIONS

PCT Search Report and Written Opinion issued in connection with corresponding PCT Application No. PCT/EP2011/070429 on May 18, 2012.

*Primary Examiner* — Mark Laurenzi
*Assistant Examiner* — Shafiq Mian
(74) *Attorney, Agent, or Firm* — GE Global Patent Operation; Cynthia W. Flanigan

(57) ABSTRACT

A turbine bypass system comprises a bypass path which is selectively operable to deliver hot gases to a gas cooler and a pebble bed positioned in the bypass path upstream of the gas cooler. The pebble bed absorbs heat from the bypass gases and thereby reduces the temperature of the bypass gases prior to delivery of the bypass gases to the gas cooler.

19 Claims, 1 Drawing Sheet

(56) References Cited

U.S. PATENT DOCUMENTS

| | | | |
|---|---|---|---|
| 5,052,918 A | | 10/1991 | Fassbinder |
| 5,269,145 A | * | 12/1993 | Krause .................. C09K 5/063 126/618 |
| 5,896,738 A | | 4/1999 | Yang et al. |
| 2006/0059936 A1 | | 3/2006 | Radke et al. |
| 2009/0178409 A1 | * | 7/2009 | Shinnar ........................... 60/645 |
| 2010/0202582 A1 | | 8/2010 | Shinnar et al. |
| 2010/0212226 A1 | * | 8/2010 | Fair ........................... C10J 3/86 48/62 R |
| 2011/0167827 A1 | | 7/2011 | Leu et al. |

FOREIGN PATENT DOCUMENTS

| | | |
|---|---|---|
| GB | 2453849 | 4/2009 |
| JP | 58-175792 | 10/1983 |
| RU | 2062887 C1 | 6/1996 |
| RU | 64699 U1 | 7/2007 |
| WO | 2009082713 A1 | 7/2009 |
| WO | 2010034659 A2 | 4/2010 |
| WO | 2012069369 A1 | 5/2012 |

* cited by examiner

TURBINE BYPASS SYSTEM

TECHNICAL FIELD

Embodiments of the present invention relate to a turbine bypass system and to a method for operating a turbine bypass system.

TECHNICAL BACKGROUND

In some thermal power plants that generate high pressure, high temperature gas or steam that is passed through a turbine to generate power, the flow of hot gases to the turbine cannot be instantaneously reduced or prevented by simply controlling the gas generator. In a steam turbine power plant for example, the steam generator (boiler) cannot be shut down and re-started instantaneously. In the event of shutdown of the turbine in a thermal power plant, for example during load rejection, a turbine bypass system is, therefore, needed to prevent the admission of hot gases (such as steam) into the turbine.

Known turbine bypass systems include a gas cooler which cools the bypass gases. The components of the gas cooler are subjected to severe thermal stresses during initial operation of the bypass system due to the large temperature difference between the hot bypass gases and the relatively cool components of the gas cooler. Mechanical failure of the components is, therefore, common.

Attempts have been made to reduce the temperature of the bypass gases before delivery to the gas cooler, but component failure has still been encountered. There is, therefore, a need for an improved turbine bypass system.

SUMMARY OF THE INVENTION

As used in this Summary and in the appended claims, unless "steam" is specifically mentioned, the word "gas" should be understood to include steam in both its vapour and gaseous states.

According to a first aspect of the present invention, there is provided a turbine bypass system comprising:

a bypass path selectively operable to deliver hot gases to a gas cooler; and a pebble bed positioned in the bypass path upstream of the gas cooler which is operable to absorb heat from the bypass gases and thereby reduce the temperature of the bypass gases prior to delivery of the bypass gases to the gas cooler.

According to a second aspect of the present invention, there is provided a method for operating a turbine bypass system comprising:

delivering hot gases along a bypass path to a gas cooler; and passing the bypass gases through a pebble bed, positioned in the bypass path upstream of the gas cooler, to absorb heat from the bypass gases and thereby reduce the temperature of the bypass gases prior to delivery of the bypass gases to the gas cooler.

The gas cooler is subjected to much lower temperatures, and therefore reduced thermal stresses, during initial operation of the turbine bypass system due to the fact that the temperature of the bypass gases is reduced by the pebble bed.

The temperature of the pebble bed increases gradually as bypass gases flow through the pebble bed and the amount of heat absorbed from the bypass gases by the pebble bed thus decreases gradually. As a result, the temperature of the bypass gases that are delivered along the bypass path, from the pebble bed to the gas cooler, gradually increases. This gradual temperature increase provides a gradual increase in the temperature of the components of the gas cooler, thereby reducing instantaneous thermal stresses and the resultant likelihood of mechanical failure of the gas cooler components during initial operation of the turbine bypass system.

The pebble bed may comprise a low alloy steel shell lined with common refractory material such as firebrick with an inner lining of super refractory material such as silicon carbide, mullite, or alumina. The pebbles of, for example, 12 mm to 30 mm in diameter, are also formed of solid super-refractory material.

The pebbles may be supported on a perforated layer comprising a high alloy steel platform, which itself may be supported on high alloy steel bearers. Alternatively, or additionally, the platform may be upwardly convex (domed) for better support of the weight of the pebbles. As a further alternative, for reduced cost and maintenance, the pebble bed may be supported by a perforated dome of super refractory material formed into tapered bricks arranged in ring formation. In this case grooves in the sides of the assembled bricks form holes for the passage of the hot bypass gases therethrough.

The perforated support layer may also perform as a baffle in order to diffuse the bypass gases more evenly over the lateral extent of the pebble bed. For example, the apertures in the support layer may be smaller in the middle than near the edges of the pebble bed.

The turbine bypass system may include a cooling arrangement which is selectively operable to cool the pebble bed. The cooling arrangement is typically operable to cool the pebble bed when the bypass path is inoperative. The pebble bed is, thus, cooled after completion of a bypass operation when bypass gases are not flowing along the bypass path through the pebble bed.

The cooling arrangement may be selectively operable to deliver fluid coolant to the pebble bed to cool the pebble bed. The fluid coolant may be liquid coolant, such as water or liquid nitrogen, and/or gas coolant, such as steam or nitrogen gas.

Where the turbine is a steam turbine, the cooling arrangement may be operable to deliver gas coolant, preferably relatively low temperature steam, to the pebble bed and may thereafter be operable to deliver liquid coolant, such as water, to the pebble bed. The pebble bed may include a condensate drain for removing any condensate produced during heating and cooling cycle of the pebble bed. Furthermore, the gas cooler may include a condenser, typically a steam dump condenser.

In the case where the turbine is a gas turbine, the cooling arrangement may comprise a closed-loop cooling circuit for recirculating the fluid coolant to the pebble bed and may include a heat exchanger for cooling the recirculating fluid coolant. The fluid coolant used in the closed-loop cooling circuit may be a gas, a typical example being nitrogen gas. Furthermore, the gas cooler may comprise a heat exchanger, e.g., a waste heat recovery device.

The aforesaid method for operating the turbine bypass system may further comprise cooling the pebble bed. The step of cooling the pebble bed may be carried out when gases are not delivered along the bypass path to the gas cooler. As indicated above, this enables the pebble bed to be cooled after completion of a bypass operation when bypass gases are not flowing along the bypass path through the pebble bed.

The step of cooling the pebble bed may comprise delivering fluid coolant to the pebble bed.

In one embodiment of the method, the step of cooling the pebble bed comprises initially delivering gas coolant, such as steam, to the pebble bed and thereafter delivering liquid coolant, such as water, to the pebble bed. This results in a two-stage cooling process in which the initial gas cooling step cools the pebble bed to an intermediate temperature and the subsequent liquid cooling step provides further cooling of the pebble bed.

In another embodiment of the method, the step of cooling the pebble bed comprises recirculating fluid coolant to the pebble bed and may comprise extracting heat from the fluid coolant using a heat exchanger. As indicated above, the recirculating fluid coolant used is normally a gas coolant, such as nitrogen gas.

BRIEF DESCRIPTION OF THE DRAWINGS

Embodiments of the present invention will now be described by way of example only and with reference to the accompanying drawings, in which.

DETAILED DESCRIPTION OF EMBODIMENTS OF THE INVENTION

Figure 1:
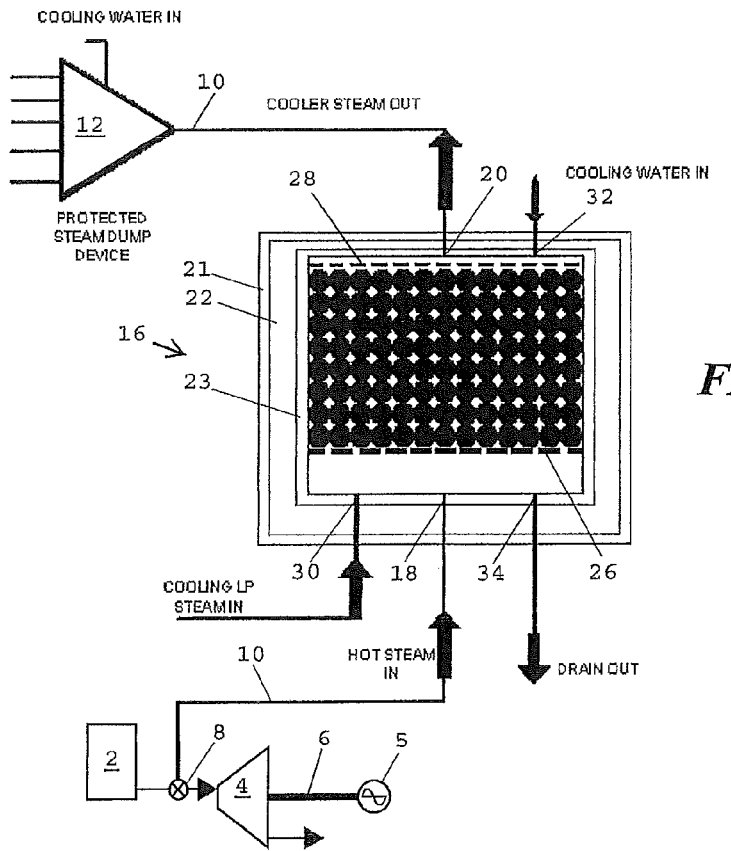
FIG. 1 is diagrammatic view of one embodiment of a turbine bypass system.

FIG. 1 illustrates a bypass system forming part of a thermal power plant employing a steam generator 2 that feeds high pressure, high temperature steam to steam turbine 4 for power production in electrical generator 5, which is driven by turbine 4 through shaft 6. The steam turbine bypass system is used to divert superheated steam produced in a steam generator 2 away from the inlet of a steam turbine 4, for example during emergency turbine shutdown (also known as turbine trip). Turbine 4 may comprise multi-stage high pressure and low pressure modules, but these are not shown for convenience of illustration.

The steam turbine bypass system includes a diverter valve 8, a bypass path 10 for diverting steam away from the steam turbine inlet, and a gas cooler 12 in the form of a steam dump condenser. Steam is delivered along the bypass path 10 to the steam dump condenser 12 which, as known, includes a cooling water inlet 14.

To reduce thermal shock to the condenser 12, the steam turbine bypass system includes a pebble bed 16, which would be constructed as a cylindrical pressure vessel with domed upper and lower ends, although it is only illustrated diagrammatically in FIG. 1. The pebble bed 16 is positioned in the bypass path 10 upstream of the steam dump condenser 12 and includes a steam inlet 18 for receiving superheated bypass steam from the steam generator and a steam outlet 20 via which steam is delivered from the pebble bed 16 to the steam dump condenser 12

During a bypass operation, superheated bypass steam is delivered along the bypass path 10 and into the pebble bed 16 via the steam inlet 18. As the superheated bypass steam passes through the pebble bed 16, heat is absorbed from the steam by the pebble bed 16 and this reduces the temperature of the bypass steam. The cooled bypass steam is delivered via the steam outlet 20 to the steam dump condenser 12 where the bypass steam is cooled further in a conventional manner.

At the start of a steam bypass operation, the pebble bed 18 is at its coolest temperature and absorbs a significant amount of heat from the bypass steam. The temperature of the bypass steam is, thus, reduced significantly before the bypass steam is delivered along the bypass path 10, via the steam outlet 20, to the steam dump condenser 12. The components of the steam dump condenser 12, which are at their lowest temperature at the start of the bypass operation, are thus subjected to much lower temperatures, and therefore reduced thermal stresses, at the start of the bypass operation due to the fact that the temperature of the bypass steam is reduced by the pebble bed 16.

As bypass steam continues to flow along the bypass path 10 through the pebble bed 16, the temperature of the pebble bed 16 increases as it absorbs heat from the bypass steam. The temperature difference between the pebble bed 18 and the bypass steam thus gradually decreases. This reduces the heat absorption capability of the pebble bed 16 and results in a gradual increase in the temperature of the bypass steam that is delivered along the bypass path 10, via the steam outlet 20, to the steam dump condenser 12. This gradual increase in the temperature of the bypass steam leads to a gradual increase in the temperature of the components of the steam dump condenser 12, thereby reducing thermal stresses and the resultant likelihood of mechanical failure of the steam dump condenser 12 components.

The pebble bed 16 will eventually attain the same temperature as the bypass steam, at which point heat will no longer absorbed by the pebble bed 16 such that the temperature of the bypass steam will be substantially equal at the steam inlet 18 and the steam outlet 20. The temperature of the bypass steam delivered along the bypass path 10 to the steam dump condenser 12 will, therefore, be substantially equal to the temperature of the steam produced by the steam generator. By this point, however, the components of the steam dump condenser 12 have gradually heated up ensuring that thermal fatigue of the components is minimised.

The pebble bed 16 comprises a low alloy steel shell 21 lined with common refractory material 22 such as firebrick with an inner lining 23 of super refractory material such as silicon carbide, mullite, or alumina. The pebbles 24 are also formed of solid super-refractory material and may be, e.g., between 12 mm and 30 mm in diameter.

The pebbles 24 are supported on a perforated support layer 26 comprising a high alloy steel platform, which may itself be supported on high alloy steel bearers (not shown). The perforated support layer 26 also acts as a baffle in order to diffuse the bypass steam more evenly over the lateral extent of the pebbles 24 in the pebble bed 16, and to this end the apertures in the support layer 26 may be smaller in the middle than near the edges, as indicated in diagrammatic fashion. A perforated upper layer 28, similar to the perforated support layer 26, is also provided above the pebbles 24.

An alternative way of supporting the pebble mass within the pebble bed is to use a perforated upwardly convex dome (not shown), which may be formed of the high alloy steel. Alternatively, as already known in the art, a dome to support the pebbles may comprise super refractory material formed into tapered bricks arranged in a ring formation. In the latter arrangement, grooves in the sides of the assembled bricks form holes for the passage of the hot bypass steam through the dome and into the pebbles.

After completion of the bypass operation, when bypass steam is no longer fed along the bypass path 10 through the pebble bed 16 to the steam dump condenser 12, it is necessary to cool the pebble bed 16 so that it is capable of cooling bypass steam during the initial stages of a subsequent bypass operation. The steam turbine bypass system includes a cooling arrangement for this purpose.

The cooling arrangement includes a first fluid coolant inlet 30 at the base of the pebble bed 16 which delivers cooling steam (typically low pressure steam) to the pebble bed 16 and a second fluid coolant inlet 32 at the top of the pebble bed 16 which delivers cooling water to the pebble bed 16. During operation of the cooling arrangement, cooling steam is initially delivered to the pebble bed 16 to cool it to a first temperature before cooling water is subsequently delivered to the pebble bed 16 to cool it further to a desired temperature. The person skilled in power plant design will realise that such cooling steam may usually be obtained from a low-pressure steam source elsewhere in the power plant. The pebble bed 16 includes a drain 34 which removes cooling water and also condensate generated during the cycle of heating and cooling of the pebbles 24.

Figure 2:
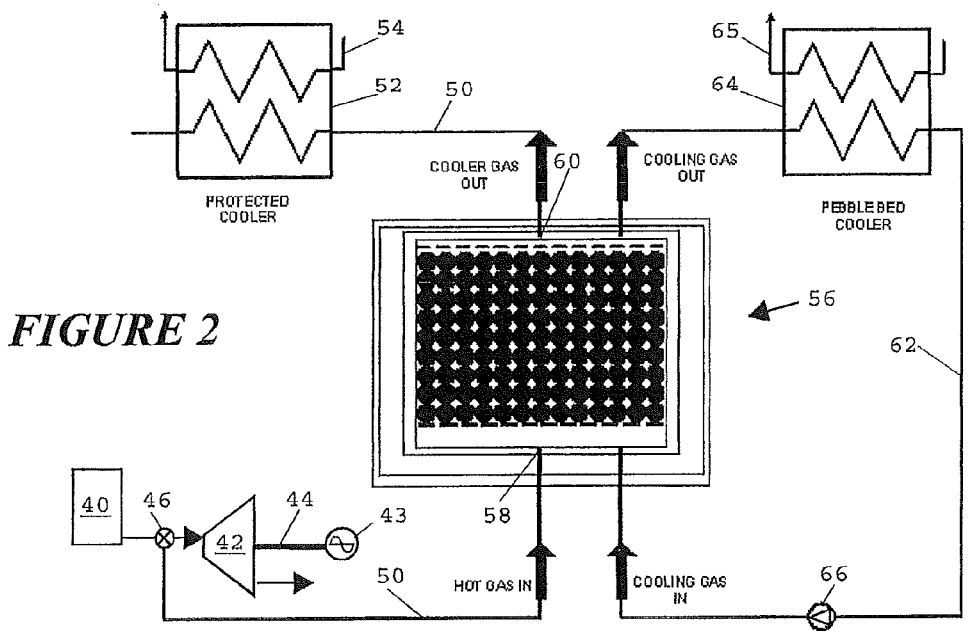
FIG. 2 is a diagrammatic view of another embodiment of a turbine bypass system.

FIG. 2 illustrates a bypass system forming part of a thermal power plant employing a source 40 which generates high pressure, high temperature gas, such as nitrogen. The gas is fed directly to gas turbine 42 for power production in electrical generator 43, which is driven by turbine 42 through shaft 44. The turbine 42 may comprise multi-stage low pressure and high pressure modules, but these are not shown for convenience of illustration. The gas turbine bypass system is used to divert high pressure, high temperature gas, for example air or nitrogen, away from the inlet of the gas turbine 42, for example during turbine shutdown (also known as turbine trip).

The gas turbine bypass system includes a diverter valve 46, a bypass path 50 for diverting bypass gases away from the gas turbine inlet and a gas cooler 52 in the form of a heat exchanger, which may be part of a waste heat recovery device. Bypass gases are delivered along the bypass path 50 to the heat exchanger 52, which, as known per se, includes a cooling circuit 54, fed by a coolant such as water.

The gas turbine bypass system includes a pebble bed 56 which is similar in construction and operation to the pebble bed 16 shown in FIG. 1. The pebble bed 56 is positioned in the bypass path 50 upstream of the heat exchanger 52 and includes a gas inlet 58 for receiving hot bypass gases and a gas outlet 60, via which gases are delivered from the pebble bed 56 to the heat exchanger 52.

During a bypass operation, hot bypass gases are delivered along the bypass path 50 and into the pebble bed 56 via the gas inlet 58. As the hot bypass gases pass through the pebble bed 56, heat is absorbed from the gases by the pebble bed 56 and this reduces the temperature of the bypass gases. The cooled bypass gases are delivered via the gas outlet 60 to the heat exchanger 52 where the waste heat may be recovered.

The pebble bed 56 operates in exactly the same manner as the pebble bed 16 to absorb heat from the bypass gases and thereby reduce the temperature of the bypass gases at the start of a bypass operation. As the pebble bed 56 heats up during the bypass operation, the amount of cooling provided by the pebble bed 56 decreases. This has already been described fully with reference to FIG. 1 and no further explanation is needed.

After completion of the bypass operation, when bypass gases are no longer fed along the bypass path 50 through the pebble bed 56 to the heat exchanger 52, it is necessary to cool the pebble bed 56 for the reasons already explained above. The gas turbine bypass system includes a cooling arrangement for this purpose.

The cooling arrangement comprises a closed-loop cooling circuit 62, which delivers a recirculating gas coolant, such as nitrogen gas, to the pebble bed. The cooling arrangement includes a heat exchanger 64, which cools the recirculating gas coolant by means of a cooling circuit 65 through which a coolant such as water is passed, as known per se. A pump 66 is provided to force the coolant gas around the closed-loop cooling circuit 62.

Although embodiments of the present invention have been described in the preceding paragraphs, it should be understood that various modifications may be made to those embodiments without departing from the scope of the present invention.

The invention claimed is:

1. A system comprising:
   a turbine;
   a bypass path fluidly connected to the turbine selectively operable to divert steam away from the turbine;
   a pebble bed comprising pebbles positioned in the bypass path, the pebble bed operable to absorb heat from the diverted steam; and
   a gas cooler fluidly connected to the pebble bed via the bypass path, the gas cooler operable to receive the diverted steam following temperature reduction of the diverted steam in the pebble bed and to further cool the diverted steam,
   wherein the gas cooler is external to the pebble bed.

2. The system according to claim 1, further comprising a first fluid coolant inlet and a second fluid coolant inlet selectively operable to cool the pebble bed.

3. The system according to claim 2, wherein the first fluid coolant inlet and the second fluid coolant inlet are operable to cool the pebble bed when the bypass path is inoperative.

4. The system according to claim 3, wherein the first fluid coolant inlet and the second fluid coolant inlet are selectively operable to deliver fluid coolant to the pebble bed to cool the pebble bed.

5. The system according to claim 3, wherein the turbine is a steam turbine.

6. The system according to claim 2, wherein the first fluid coolant inlet and the second fluid coolant inlet are selectively operable to deliver fluid coolant to the pebble bed to cool the pebble bed.

7. The system according to claim 6, wherein the turbine is a steam turbine.

8. The system according to claim 2, wherein the turbine is a steam turbine.

9. The system according to claim 8, wherein the gas cooler comprises a condenser.

10. The system according to claim 2, wherein:
    the turbine is a gas turbine;
    the bypass path is selectively operable to divert gas away from the turbine;
    the pebble bed is operable to absorb heat from the diverted gas; and
    the gas cooler is operable to receive the diverted steam or gas following temperature reduction of the diverted gas in the pebble bed and to further cool the diverted gas.

11. The system according to claim 10, wherein the gas cooler comprises a first heat exchanger.

12. The system according to claim 10, further comprising a closed-loop cooling circuit for recirculating fluid coolant to the pebble bed and a second heat exchanger for cooling the recirculating fluid coolant.

13. The system according to claim 1, wherein the pebbles of the pebble bed are supported on a perforated support layer in order to diffuse the diverted steam evenly over the lateral extent of the pebbles.

14. A method comprising:
    selectively diverting steam away from a turbine along a bypass path;

passing the diverted steam through a pebble bed comprising pebbles positioned in the bypass path to absorb heat from the diverted steam;

delivering the diverted steam, following temperature reduction of the diverted steam in the pebble bed, to a gas cooler fluidly connected to the pebble bed via the bypass path; and cooling the diverted steam by the gas cooler, wherein the gas cooler is external to the pebble bed.

15. The method according to claim 14, further comprising cooling the pebble bed.

16. The method according to claim 15, wherein cooling of the pebble bed occurs when the diverted steam is not delivered along the bypass path to the gas cooler.

17. The method according to claim 15, wherein cooling of the pebble bed comprises delivering fluid coolant to the pebble bed to cool the pebble bed.

18. The method according to claim 15, wherein cooling of the pebble bed comprises initially delivering gas coolant to the pebble bed and thereafter delivering liquid coolant to the pebble bed.

19. The method according to claim 15, wherein cooling of the pebble bed comprises recirculating fluid coolant to the pebble bed and extracting heat from the recirculating fluid coolant using a second heat exchanger.

\* \* \* \* \*